Patented Jan. 12, 1954

2,666,047

UNITED STATES PATENT OFFICE 2,666,047

CHROMATE-SULFITE REDOX - INITIATED AQUEOUS POLYMERIZATION OF VINYL CHLORIDE

George J. Koch, Jr., Painesville, Ohio, assignor to Diamond Alkali Company, Cleveland, Ohio, a corporation of Delaware No Drawing. Application November 30, 1950, Serial No. 198,496

10 Claims. (Cl. 260—92.8)

This invention relates to a method for polymerizing vinyl chloride, and more particularly relates to a method incorporating a non-peroxidic redox system for initiating and catalyzing the polymerization of vinyl chloride.

It has heretofore been proposed to polymerize vinyl chloride dispersed in an aqueous medium and, moreover, it has been proposed broadly to catalyze the polymerization of vinyl chloride dispersed in aqueous media by means of an inorganic, non-peroxidic redox system. This broad proposal, however, has been found to be grossly inadequate, and inaccurate in specific instances, in presenting any basis for the use of non-peroxidic oxidizing agents in redox systems for the catalysis of the polymerization of vinyl derivatives. Also, this broad proposal has failed to teach anything relative to the potential effectiveness and the advantages of employing chromate salts in combination with sulfite salts for this purpose. Indeed, the literature in presenting reaction mechanisms for the reduction of the chromate ion in dilute solution would lead one skilled in the art to the conclusion that the combination of a chromate salt and a sulfite salt would not induce the polymerization of vinyl chloride.

Contrary to the theories presented in the literature referred to above relative to the reaction mechanism for the reduction of the chromate ion, it has now been found that a redox system composed of sulfite ions as the reducing agent and chromate ions as the oxidizing agent may be caused to react in a dilute aqueous solution in contact with vinyl chromide monomer in such manner as to initiate and catalyze the polymerization reaction to the end that high rates of conversion of monomeric vinyl chloride to polymers having relatively high molecular weight are obtained.

One of the objects of the present invention is to provide a redox system for catalyzing the polymerization of vinyl chloride, in which system a non-peroxidic oxidizing agent is employed.

Another object of the invention is to provide a method for the redox-catalyzed polymerization of vinyl chloride, in which the redox system is composed of sulfite ions and chromate ions.

These and other objects of the invention will be apparent to those skilled in the art from the disclosure hereinbelow.

The present invention is directed to a method of polymerizing vinyl chloride which includes the steps of dispersing monomeric vinyl chloride in an aqueous medium containing a redox system composed of sulfite ions and chromate ions, and recovering a polymerizate from said medium.

In practicing the method of the present invention, the redox system composed of sulfite ions and chromate ions as a catalyst for the polymerization of vinyl chloride may be employed by combining water, a suitable emulsifier or dispersant, if desired, and the redox system ingredients, and immediately after or concurrently with the introduction of the redox system ingredients into the aqueous medium, dispersing monomeric vinyl chloride as a liquid in the aqueous medium, and carrying out the polymerization under the autogeneous pressure of the components of the polymerization reaction mass.

Another manner in which the redox system of the present invention may be employed includes combining the water, a suitable emulsifier or dispersant, if desired, and either member of the redox system, dispersing liquid monomeric vinyl chloride in the aqueous medium, and then introducing the other member of the redox system into the aqueous medium, and carrying out the polymerization reaction under the autogeneous pressure generated by the components of the polymerization reaction mass.

Two variations of this latter procedure for carrying the present invention into effect may also be employed to advantage; that is, (1) the liquid monomeric vinyl chloride and the member of the redox system not already present in the aqueous medium may be emulsified or dispersed in the aqueous medium concurrently and gradually over an extended period of time, or (2) the aqueous medium, including an emulsifier or dispersant, if desired, and either member of the redox system may be frozen to a solid mass and thereafter liquid monomeric vinyl chloride, together with the remaining member of the redox system, brought into contact with the frozen mass, followed by thawing and agitation of the polymerization mass. It will be observed in either of the latter two procedures, the redox system ingredients and the monomeric vinyl chloride are brought into reactive contact with one another gradually over a period of time, and it is believed that such technique is beneficial in promoting high rates of conversion of monomer to polymers having molecular weights of the order of 100,000.

Conditions which have been found to exert an influence upon the polymerization conversion rate in the method of the present invention include temperature, pH of the aqueous medium, the relative molar proportions of the components of the redox system, the relative proportion of the sum of the mols of the components of the redox system to the mols of monomer employed, and the relative proportion of the aqueous medium to the weight of monomer used.

In practicing the method of the present invention, it has been found that the polymerization reaction temperature may suitably be substantially within the range of 25°–50° C., preferably, however, within the range of about 35°–45° C. In general, at temperatures below 25° C. the conversion rate of monomer to polymers is relatively low and results in polymers having molecular weights in excess of 150,000, which polymers are not technically as desirable as polymers of molecular weights of the order of 100,000, which are more easily compounded. Also, polymerization reaction temperatures above 50° C. result in the obtaining of very low molecular weight polymers at a very high conversion rate, which low molecular weight polymers are generally not as desirable in the synthetic plastics arts as the higher molecular weight polymers obtained within the preferred temperature range noted hereinabove, in that such low molecular weight polymers lack the desired degree of tenacity necessary to the fabrication of shaped articles.

The pH of the aqueous medium is preferably maintained substantially within the range of 2–9 during the polymerization reaction, it having been found that where the pH values of the aqueous medium are substantially within the range of 4.5 to 7, the highest conversion rates to polymers having molecular weights of the order of 100,000 are obtained. It is the vinyl chloride polymers having molecular weights of this general order which are technically most useful in the commercial arts.

The molecular weight values referred to hereinabove, as well as in the discussion following and the specific examples hereinbelow, are calculated from the viscosity of a solution of 1 gram of polymerizate in 100 mls. of solvent (cyclohexanone), as determined by means of a modified "Ostwald" viscosimeter tube immersed in a constant temperature bath.

The redox system of the present invention is composed of sources of sulfite ions and chromate ions, which sources may be any of the many water-soluble chromate and sulfite salts well-known in the chemical arts. These salts may be classified broadly as to their relative solubility in aqueous media, such as the alkali metal and ammonium chromates and sulfites which are generally referred to as being very water-soluble, the alkaline earth metal chromates and sulfites which are considered as generally less water-soluble than the alkali metal and ammonium salts, as well as the heavy metal chromates and sulfites whose solubility although quite low is determinable.

The preferred sources of chromate ions for the purposes of the present invention include the water-soluble alkali metal and ammonium chromates or bichromates, such as the lithium, sodium, potassium, rubidium, and cesium chromates or bichromates, as well as chromic anhydride ($CrO_3$). Similarly, the alkali metal and ammonium sulfites, bisulfites, or the metabisulfites, such as the lithium, sodium, potassium, rubidium, and cesium sulfite, bisulfite, or metabisulfite, salts are preferred herein.

Without intending to be limited by theoretical considerations as to the natural laws underlying the invention, the observations and discussions given hereinbelow are offered in regard thereto as principles upon which to base a feasible process for the polymerization of vinyl chloride by means of a redox system composed of chromates and sulfites.

Chromate and bichromate salts, in dilute aqueous medium (less than 0.01 N), may be ionized in neutral or slightly acid or slightly alkaline solution to give an equilibrium mixture of

ions and

ions. In the neutral or the slightly acid portion of the pH range, the

ion is believed to predominate in the mixture, whereas the definitely alkaline portion of the pH range is believed to promote the predominance of the

ion. An analogous condition may obtain in the ionization of sulfite, bisulfite, or metabisulfite salts, in acid solution to give in the equilibrium mixtures both sulfite and bisulfite ions. It is, therefore, the intention here to include these species, as well as others which may result from the various ranges of conditions within which the invention may be employed, under the general term of chromate and sulfite ions.

Whether only one or both of these ionic forms of hexavalent chromium referred to hereinabove are involved in the formation of sulfite or bisulfite radicals in the aqueous medium, or whether these ions are capable of becoming radicals themselves, is not known. It has been found, however, that polymers obtained by initiating and catalyzing the polymerization reaction with redox systems composed of chromate ions and sulfite ions, exhibit a slight bluish-green coloration, characteristic of trivalent chromium, which coloration is not removed by water washing of the polymer particles, but is removed by washing the polymer particles with oxidizing agents capable of oxidizing trivalent chromium to hexavalent chromium. Moreover, the washings in such case exhibit a slight yellow coloration characteristic of hexavalent chromium. It is believed, therefore, that the trivalent chromium is in some way chemically bound to terminal sulfonic groups in a salt complex, which sulfonic groups originate in the polymer from the reaction of sulfite or bisulfite radicals with the monomer molecules at the initiation of the polymerization reaction.

The redox system composed of sulfite ions and chromate ions employed in the method of the present invention is preferably prepared from chromate and sulfite salts in molar ratios of chromate ions to sulfite ions, substantially within the range of 1:1 to 1:8. The choice of proportions within this range has been found to be influenced to some extent by the pH of the aqueous medium, it having been found that at pH values above 8, ratios of chromate ions to sulfite ions of the order of 1:1 to 1:3, generally are more effective in producing high conversion rates than ratios greater in the proportion of the sulfite component. This has been found also at pH values below about 4.5. At pH values of about 4.5 and below about 8, ratios of chromate ions to sulfite ions substantially within the range of 1:3 to 1:6 have been found to be most effective in producing high conversion rates of monomer to polymer.

The proportion which the sum of the mols of chromate ions and sulfite ions in the redox system bears to the mols of monomer employed may suitably be within the range of 0.1-5 mol percent of the monomer; preferably, however, this proportion is substantially within the range of 0.4-1 mol percent for obtaining high conversion rates of monomer to polymer.

The proportion of monomer to the aqueous medium may be substantially within the range of 1:2 to 1:4, but is preferably, however, of the order of about 1:3 for ease in separating and recovering the polymerizate from the aqueous medium.

A suitable emulsifier or dispersing agent substantially inert to the chromate and sulfite ions may also be employed in the aqueous phase in concentrations within the range of 0.5-2% of the weight of the monomer, depending upon the emulsifying agent or dispersing agent used and its efficiency in producing the desired degree of emulsification or dispersion in neutral, acid, or alkaline media. Emulsifiers which have been found suitable in this connection include anion active wetting agents, such as the alkyl sulfates, alkyl sulfonates, alkyl aryl sulfonates, cation action wetting agents, such as quaternary ammonium compounds, and the like, as well as nonionic emulsifying agents, such as the polyhydroxy compounds, for example, polyvinyl alcohol, ethylene oxide polymers, hydroxy esters and ethers, such as the polyglycols, and the like. However, the alkyl sulfates having from 12 to 14 carbon atoms in the alkyl chain are preferred for the reason that such alkyl sulfates emulsifiers are readily available commercially in a relatively high state of purity. The purity of the emulsifier is of significance in any emulsion polymerization system since it has long been known that where such emulsifier contains substantial amounts of olefinic alkyl chains, particularly the conjugated olefinic alkyl chains, or where the alkyl chain bears tertiary hydrogen, either of which may be present in certain of the alkyl aryl sulfonates, such compounds are responsible for terminating the polymerization of the above-noted olefinic monomers relatively early in the polymerization reaction period, whereby a low yield of polymerizate results.

The pH of the aqueous medium may be adjusted to the desired point within the above-noted range, with acids or alkalies not of an oxidizing or reducing character, at any step prior to adding the second component of the redox system thereto. In general, it has been found that the pH of the aqueous medium increases slightly as the polymerization reaction proceeds, and although it is not necessary in the practice of the method of the present invention, buffer salts may be added to the aqueous phase in amounts sufficient to maintain the reaction medium substantially constant at a desired point in the above pH range during the polymerization reaction. Buffers which have been found suitable for the purposes herein include mixtures of acetic acid and sodium acetate, as well as the universal buffer of Britton and Robinson ("Hydrogen Ions," Britton, second edition, page 225) consisting of acetic acid-phosphoric acid-boric acid-NaOH, and the like.

In order that those skilled in the art may better understand the method of the present invention and in what manner the same may be carried into effect, the following specific examples are offered:

Example I

Batches composed of 300 parts of water containing 0.93 part of $Na_2SO_3$, and 1 part of a commercial sodium lauryl sulfate purified to remove sodium sulfate and polymerization inhibitors, are adjusted to the pH values given in the table below by means of dilute sulfuric acid (10%) and dilute NaOH (5%) solutions. The solutions are then frozen at $-25°$ C. in suitable vessels. To the solid masses in each of the vessels there are added 0.14 part of $Na_2Cr_2O_7.2H_2O$ dissolved in 10 parts of water and 100 parts of liquid vinyl chloride monomer. The vessels are closed to the atmosphere, immersed in a constant temperature bath at 40° C., and the contents of the vessels agitated. The polymerization reaction is carried out at the autogenous pressure of the system. The results are given in the table below:

| Redox system | | Redox molar ratio | pH | | Time, hours | Percent conv. | Mol. wt. $\times 10^{-4}$ |
|---|---|---|---|---|---|---|---|
| $Na_2Cr_2O_7.2H_2O$ | $Na_2SO_3$ | | Init. | Final | | | |
| 0.14 | 0.93 | 1:7.7 | 8.0 | 8.1 | 2.17 | 27 | 10.88 |
| 0.14 | 0.93 | 1:7.7 | 7.0 | 7.08 | 1 | 51 | ------ |
| 0.14 | 0.93 | 1:7.7 | ----- | ----- | 2.17 | 92 | 9.98 |
| 0.14 | 0.93 | 1:7.7 | 6.0 | 6.27 | 0.5 | 48 | ------ |
| 0.14 | 0.93 | 1:7.7 | 6.0 | 6.20 | 2.17 | 81 | 10.22 |
| 0.14 | 0.93 | 1:7.7 | 5.0 | 5.32 | 0.5 | 27 | ------ |
| 0.14 | 0.93 | 1:7.7 | ----- | 5.15 | 2.17 | 35 | 12.95 |
| 0.14 | 0.93 | 1:7.7 | 4.0 | 4.7 | 2.17 | 39 | 12.43 |
| 0.14 | 0.93 | 1:7.7 | 3.0 | 4.12 | 1 | 24 | 12.0 |
| 0.14 | 0.93 | 1:7.7 | 2.0 | 2.45 | 1 | 6 | ------ |
| 0.14 | 0.93 | 1:7.7 | ----- | 2.25 | 2.17 | 27 | 10.9 |

Redox system, $CrO_4^{--} + SO_3^{--}$, mol percent of monomer = 0.52.
Temperature of polymerization 40° C.
Weight ratio of polymerization medium to monomer = 3:1.

Example II

Batches composed of 300 parts of water containing 0.93 part of $Na_2SO_3$ and 1 part of commercial sodium lauryl sulfate purified to remove sodium sulfate and polymerization inhibitors are each gradually combined with 100 parts of liquid monomeric vinyl chloride and 0.37 part of $$Na_2Cr_2O_7.2H_2O$$

over a period of about five minutes with agitation and at the autogenous pressure of system. The pH values of the several batches are adjusted with dilute sulfuric acid solution (10%), and with dilute NaOH solution (5%) prior to adding monomer and the bichromate salt.

| Redox system | | Redox molar ratio | pH, init. | Time, hours | Percent conv. |
|---|---|---|---|---|---|
| $Na_2Cr_2O_7.2H_2O$ | $Na_2SO_3$ | | | | |
| 0.37 | 0.93 | 1:3 | 9.0 | 0.75 | 25 |
| 0.37 | 0.93 | 1:3 | ----- | 1.5 | 32 |
| 0.37 | 0.93 | 1:3 | ----- | 3.75 | 33 |
| 0.37 | 0.93 | 1:3 | 8.0 | 0.75 | 40 |
| 0.37 | 0.93 | 1:3 | ----- | 1 | 48 |
| 0.37 | 0.93 | 1:3 | ----- | 1.5 | 64 |
| 0.37 | 0.93 | 1:3 | 7.0 | 0.75 | 47 |
| 0.37 | 0.93 | 1:3 | ----- | 1 | 57 |
| 0.37 | 0.93 | 1:3 | ----- | 1.5 | 72 |
| 0.37 | 0.93 | 1:3 | 6.0 | 0.75 | 54 |
| 0.37 | 0.93 | 1:3 | ----- | 1 | 70 |
| 0.37 | 0.93 | 1:3 | ----- | 1.3 | 80 |
| 0.37 | 0.93 | 1:3 | ----- | 1.4 | 87 |
| 0.37 | 0.93 | 1:3 | ----- | 2.6 | 95 |
| 0.37 | 0.93 | 1:3 | 5.0 | 1.25 | 89 |
| 0.37 | 0.93 | 1:3 | ----- | 2.6 | 90 |
| 0.37 | 0.93 | 1:3 | 4.0 | 0.5 | 25 |
| 0.37 | 0.93 | 1:3 | ----- | 1 | 35 |
| 0.37 | 0.93 | 1:3 | 3.0 | 1.4 | 11 |
| 0.37 | 0.93 | 1:3 | ----- | 2.6 | 12 |
| 0.37 | 0.93 | 1:3 | ----- | 4 | 17 |

Redox system, mol percent of monomer = 0.61.
Weight ratio of polymerization medium to monomer = 3:1.
Temperature of polymerization = 40° C.

Example III

Solutions of both $CrO_3$ and $Na_2SO_3$ are added to a mixture of 300 parts of water and 1 part of purified sodium lauryl sulfate as described in Example I. The mixture is refrigerated at $-25°$ C. to a solid mass. One hundred parts of vinyl chloride are added thereafter as a liquid, the whole reaction mass heated to 40° C., with agitation, and polymerization carried out at the autogenous pressure of the system.

| Redox system | | Redox molar ratio | pH | | Time, hours | Percent conv. |
|---|---|---|---|---|---|---|
| $CrO_3$ | $Na_2SO_3$ | | Init. | Final | | |
| 0.37 (0.0037 mol) | 0.93 (0.0074 mol) | 1:2 | 4.4 | 3.9 | 6.6 | 6 |
| | | | | 4.0 | 23 | 4 |

Redox system: 0.69 mol percent of monomer.

Example IV

Sodium sulfite is dissolved in 100 parts of water containing 1 part of purified sodium lauryl sulfate, the pH adjusted to 4.4, the mixture refrigerated at −25° C., 100 parts of liquid vinyl chloride monomer and an aqueous solution of $CrO_3$ are then mixed therewith and the whole reaction mass heated to 40° C., with agitation to disperse the monomer. The polymerization reaction is carried out at the autogenous pressure of the system.

| Redox system | | Redox molar ratio | pH | | Time, hours | Percent conv. | Mol. Wt. ×10⁻⁴ |
|---|---|---|---|---|---|---|---|
| $CrO_3$ | $Na_2SO_3$ | | Init. | Final | | | |
| 0.37 (0.0037 mol) | 0.465 (0.0037 mol) | 1:1 | 4.4 | 3.75 | 1.5 | 81 | 10.06 |
| | | | | 3.85 | 3.75 | 91 | |

For purposes of comparison, certain of the data from the foregoing examples are incorporated with other data of experiments which are carried out in the manner described in Examples I, II, and IV above. The data are tabulated below:

| Redox system | | | | pH | | Time, hrs. | Percent conv. |
|---|---|---|---|---|---|---|---|
| $Na_2Cr_2O_7 \cdot 2H_2O$ $CrO_4$ mol. | $Na_2SO_3$ mol. | Mol. ratio $CrO_4^{--}$ $SO_3^{--}$ | $CrO_4^{--}+SO_3^{--}$ mol. percent monomer | Init. | Final | | |
| 0.0074 | 0.059 | 1:8 | 4.14 | 6.0 | 6.78 | 1 | 17 |
| 0.0009 | 0.0074 | 1:7.7 | 0.52 | 6.0 | 6.27 | 0.5 | 48 |
| | | | | | 6.20 | 2.17 | 81 |
| 0.0025 | 0.0074 | 1:3 | 0.62 | 6.0 | | 1.3 | 80 |
| | | | | | | 1.5 | 87 |
| | | | | | | 2.5 | 95 |
| 0.0074 | 0.0074 | 1:1 | 0.925 | 6.0 | 6.75 | 3 | 26 |
| 0.0037 | 0.0037 | 1:1 | 0.46 | 4.4 | 3.75 | 1.5 | 81 |
| | | | | | 3.85 | 3.75 | 91 |

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of polymerizing vinyl chloride which includes the steps of dispersing monomeric vinyl chloride in an aqueous medium containing a redox catalyst system composed of chromate ions and sulfite ions, and recovering a vinyl chloride polymer from said medium.

2. The method of claim 1 in which the molar ratio of said chromate ions to sulfite ions in said redox system is substantially within the range of 1:8 to 1:1.

3. The method of claim 2 in which the sum of the mols of said chromate ions and said sulfite ions of said redox system is substantially within the range of 0.1 to 5 mol percent of said monomeric vinyl chloride.

4. The method of claim 1 in which the pH of the aqueous medium is maintained substantially within the range of 2–9 during the polymerization reaction.

5. The method of polymerizing vinyl chloride which includes the steps of dispersing monomeric vinyl chloride in an aqueous medium containing a redox catalyst system composed of chromate ions and sulfite ions, and an emulsifier effective to emulsify said vinyl chloride in said medium, maintaining the pH of said medium substantially within the range of 2–9 during the polymerization reaction, and recovering a vinyl chloride polymer from said medium.

6. The method of claim 5 in which the molar ratio of said chromate ions to sulfite ions in said redox system is substantially within the range of 1:1 to 1:8.

7. The method of claim 6 in which the sum of the mols of said chromate ion and the mols of said sulfite ion in said redox system is substantially within the range of 0.1 to 5 mol percent of said monomeric vinyl chloride.

8. The method of polymerizing vinyl chloride which includes the steps of contacting an aqueous medium containing catalystic amounts of a water-soluble salt of the class consisting of chromates and sulfites with monomeric vinyl chloride and catalystic amounts of the salt of said class which is absent from said aqueous medium, agitating the resulting mixture under autogenous pressure during the polymerization reaction period, and recovering a vinyl chloride polymer from said medium.

9. The method of polymerizing vinyl chloride which includes the steps of contacting a frozen aqueous medium, a water-soluble salt of the class consisting of chromates and sulfites with monomeric vinyl chloride and the salt of said class which is absent from said frozen aqueous medium, agitating and heating the resulting mixture to a temperature substantially within the range of 25–50° C. under autogenous pressure, and recovering a vinyl chloride polymer from said mixture.

10. The method of polymerizing vinyl chloride which includes the steps of dispersing monomeric vinyl chloride in an aqueous medium containing a catalytic amount of a salt of the class consisting of chromates and sulfites, adding to the resulting mixture a catalytic amount of the salt of said class which is absent from said medium, agitating and heating the entire mass to a temperature substantially within the range of 25–50° C. under autogenous pressure, and recovering a vinyl chloride polymer form said medium.

GEORGE J. KOCH, Jr.

References Cited in the file of this patent

UNITED STATES PATENTS

| Number | Name | Date |
|---|---|---|
| 2,299,223 | Frey | Oct. 20, 1942 |
| 2,498,226 | Sully | Feb. 21, 1950 |
| 2,531,403 | Crouch | Nov. 28, 1950 |